Patented May 25, 1954

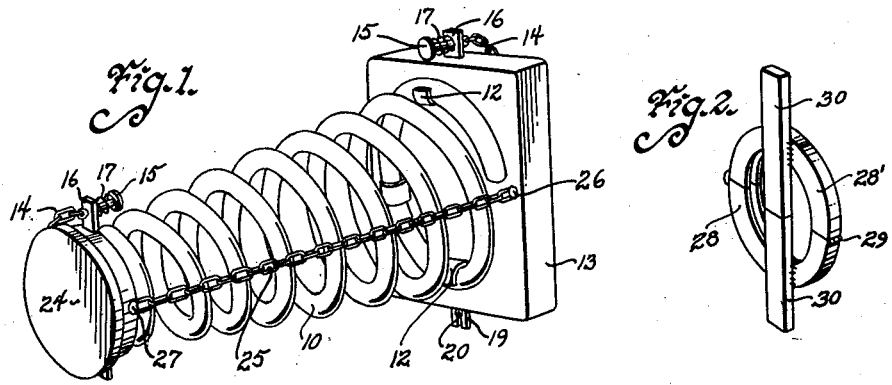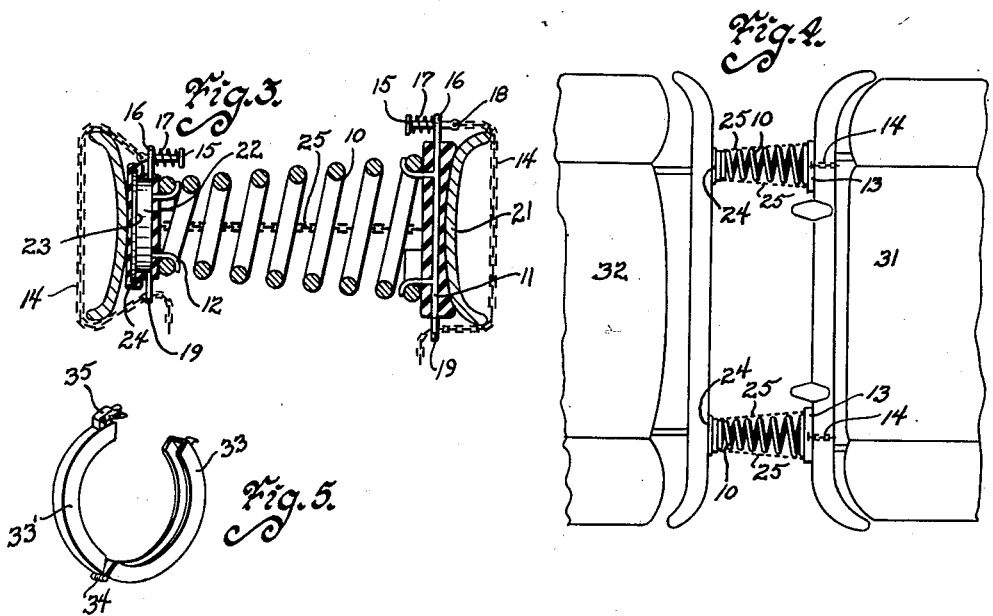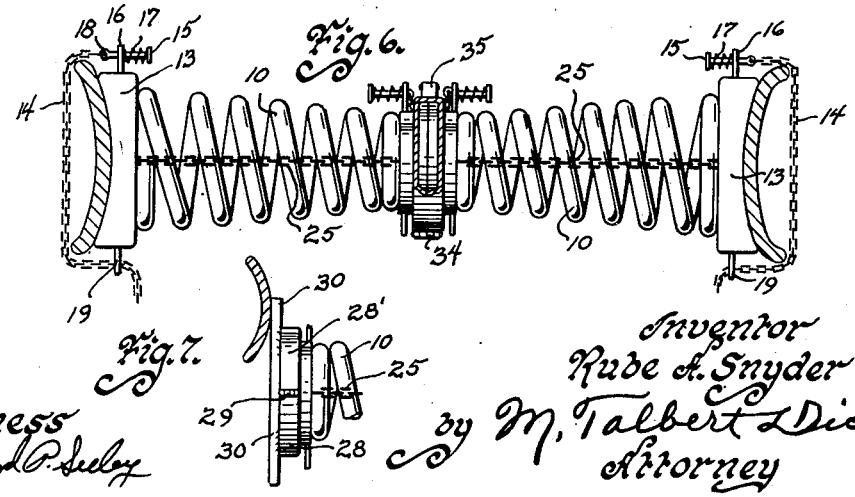

2,679,405

UNITED STATES PATENT OFFICE 2,679,405

COMBINATION PUSHING AND TOWING DEVICE

Rube A. Snyder, Corydon, Iowa

Application March 29, 1951, Serial No. 218,159

1 Claim. (Cl. 280—481)

My invention relates to the art of moving one vehicle with another. Specifically, I have invented a means for connecting two vehicles together to permit towing one with the other and which means may also serve as a buffer for pushing one vehicle with another.

Almost everyone has had the experience of having the vehicle in which he was riding stuck or aided another vehicle which was stuck. When a motor vehicle loses traction, it is necessary or desirable, frequently, to either push or pull the stuck vehicle with a second vehicle that is more advantageously situated. Not uncommonly, one or more of the vehicle operators involved in such a situation is inexperienced in either towing or being towed, pushing or being pushed. Because pushing and towing require at least a certain amount of skill and experience to be done well without special equipment, attempts to free stuck motor vehicles by using other motor vehicles frequently result in damage to either or both of the vehicles involved. A jolting contact between two vehicles rather often results in one car bumper sliding over the other with damage to grills or considerable inconvenience if the bumpers should become locked. It is even possible to injure passengers riding in the vehicles involved. As evidence of the diffculties encountered when one motor vehicle is used to tow another, one has only to discover the numerous devices in the prior art for providing motor vehicle operators with special equipment for towing.

Frequently, however, a situation arises in which it is much more feasible to push the stuck vehicle than it is to pull the same. Such is frequently the case when one car in a line of traffic gets stuck. Another situation that makes pushing a more likely procedure is one where it is difficult or impossible to approach the stuck vehicle from the forward end. Also, of course, where a casual passerby volunteers assistance it is much more convenient having freed the stuck vehicle for each of the vehicles to proceed independently their separate ways. If a towing device were used, it would be necessary to stop both vehicles and disconnect them from each other which might result in a defeat of the intended purpose. For example where the stuck vehicle is so immobilized as a result of an icy street which makes it difficult or perhaps impossible to overcome the inertia of the vehicle attempting to start from a dead stop, to stop both vehicles to disconnect a tow bar would defeat the very reason for towing. In all of these situations, a slight push will frequently free the stuck vehicle and necessitate no further contact between the vehicles. Obviously, it is desirable, therefore, for special equipment to make possible either a push or a pull while protecting the vehicle involved against damage resulting from inexperience and lack of skill on the part of either or both the operators.

Also, of course, bumpy streets and turning corners require that the special equipment be adapted to compensate for deviations in attitudes between the two vehicles. Many prior art devices for towing accomplish this end, but they achieve it by means of joints or other relatively complex structure. A structure that will compensate for deviations between vehicles without the use of joints or other complicated structure would be highly desirable.

It is the principal object of my invention therefore to provide a combination pushing and towing device wherein substantially the same equipment may be used for either pushing or towing.

It is a further object of my invention to provide such a combination pushing and towing device that will absorb shocks resulting from the manipulation of the vehicle.

It is a further object of my invention to provide a combination pushing and towing device that may be positively locked to both vehicles.

It is a further object of my invention to provide a combination pushing and towing device that compensates for deviations in the attitudes of associated vehicles without use of joints.

It is a further object of my invention to provide a combination pushing and towing device that may be quickly attached and detached to a wide variety of vehicles.

It is a further object of my invention to provide a combination pushing and towing device that will protect the vehicles and passengers riding therein against damage during the pushing or towing operation.

These and other objects will be apparent to those skilled in the art.

My invention consists in the construction, arrangement, and combination of the various parts of the device, whereby the objects contemplated are attained as hereinafter more fully set forth, pointed out in my claim, and illustrated in the accompanying drawings, in which:

Fig. 1 is a perspective view of one of my pushing and towing units,

Fig. 2 is a perspective view of my pushing adapter fixture,

Fig. 3 is a reduced cross sectional view of one of my combination pushing and towing units shown secured between two vehicles, Fig. 4 is a reduced top view of two of my units secured to the bumper of one motor vehicle and illustrating the use of the device for pushing. Only portions of the vehicles are shown in order to conserve space, Fig. 5 is a perspective view of my connector collar by means of which two of my combination units may be secured together, Fig. 6 is a cross sectional view of two vehicle bumpers and a side view of two of my combination pushing and towing units, one of which is secured to each of the vehicle bumpers and with my connector collar connecting the two units to each other, and Fig. 7 is a fragmentary view of one of my combination units with the pushing adapter fixture mounted in place and illustrating how my combination unit compensates for differences in attitude between vehicles.

Referring to the drawings, I have used the numeral 10 to designate the main resilient element of my combination unit which I have shown as being preferably a tapered coil spring. A base plate designated 11 is secured to the spring in any suitable manner and I have illustrated a preferred form as being the ears 12 which extend outwardly from the plate and engaging the spring to hold it against the plate. It would be possible to secure the plate to the spring in a variety of ways, but some technique similar to that I have illustrated is considered the preferred form. Since no heating of the spring is required, this form of securing is preferred to welding or brazing for example. Welding or brazing plates to the spring would tend to destroy the heat treating of the spring and a consequent loss of its primary advantage. A suitable means of protecting the vehicle to which the unit is to be attached may be provided such as the resilient pad of rubber or the like designated 13 which is shown as molded around the plate. Any suitable form of attachment may be used, however. A material having a friction reducing surface such as rubber or the like is considered preferable for this pad which will aid in holding the plate against slippage on the vehicle. A suitable means should be provided for securing the plate member to a vehicle which I have shown as the chain 14 or any other suitable flexible element. Any suitable means of attaching the chain would accomplish my purpose, but I prefer to use the form of attachment here shown because of its simplicity. My attaching device consists of the headed plunger designated 15 which extends through pierced ear 16 of the plate 11. A spring 17 or other suitable yielding means is used to hold the head of the plunger yieldingly away from the ear. The chain 14 is secured to the eye 18 in the end of plunger 15. A second ear designated 19 is provided at the opposite side of the plate, which ear has a key hole shaped slot 20 formed therein. This attaching structure makes it possible to merely drop the chain around some portion of a motor vehicle such as the bumper, compress the spring 17 by exerting a pulling force on chain 14 and then urge one of the chain links up into the key hole slot 20. The chain is then released and the spring 17 holds the chain link engaged in the upper portion of the key hole slot 20 by maintaining a pulling tension on the chain 14. To remove the device, the procedure for mounting is substantially reversed. Attaching and detaching my units is obviously very easily and quickly accomplished and with the expenditure of a minimum amount of effort.

A second plate member is secured to the other end of the spring 10 and this second plate member has been designated by the numeral 22. The plate 22 is secured to the spring by ears substantially identical to those securing plate 11 to the spring 10 and are also designated by the numeral 12. A structure for attaching this plate to a vehicle identical to that described in connection with the plate 11 has its respective parts designated by the same numerals used for identical parts on the attaching means described in connection with plate 11. The plate 22 may be in any suitable shape, but should be provided with a flange such as that designated by the numeral 23 for reasons which will become clear from the discussion hereinafter.

The plate 22 should also be provided with a protected and anti-skid resilient pad such as that designated by the numeral 24. Both the pad 24 and that designated 13 serve the dual function of protecting the vehicle against the abrasive action of the plates 22 and 11 and also tend to minimize rattling noises resulting from the interaction of the spring and the plates. For purposes which will become more clear hereafter, the plates are restricted with respect to lengthening as a result of pulling force applied thereon by means of flexible elements such as the chains designated 25 being secured to the plates by the bosses designated 26 and 27 respectively. While I have shown like chains at both sides, a single unit down the center of the coil spring could be used. To provide a vertically broader surface for pushing to ensure that the combination pushing and towing unit does not slip over the bumper or like of the pushed vehicle, I have provided an adapter fixture as shown in Fig. 2 which consists of a pair of similar channel members designated 28 and 28' respectively that are capable of being opened up as by means of the hinge 29 to permit them to embrace the flange 23. A clamp member not shown in Fig. 2, but identical to the one designated by the numeral 35 in Fig. 5 is provided to secure the channel member or collar around the flange 23 of plate 22. A pair of identical bar members designated 30 are rigidly secured to the respective halves of the collar 28 and serve to provide the forward end of my combination pushing and towing unit with a much taller pushing surface whenever the adapter is secured thereto than is provided by the plate alone.

One of these adapters in use is illustrated in Fig. 7. The fragment of the spring shown is distorted as might be expected as a result of the pushing vehicle having its rear wheels at a higher elevation than the rear wheels of the pushed vehicle. Fig. 7 thus illustrates how my units compensate for differences in attitude of the vehicles involved as well as showing the use of the pushing adapter. As illustrated in Fig. 4, my units may be used in pairs to share the load of pushing as shown here or of towing if connected as shown in Fig. 3. In Fig. 4, my units are connected solely to the pushing vehicle designated 31. The vehicle being pushed designated 32 is therefore free to proceed once it has been aided in escaping from a point of low traction. The same would be true if the push were administered to start a stalled engine. In some cases as in long distance towing, for example, a more flexible connection may seem desirable if considerable maneuvering is being done such as turning sharp corners and the like. Under such circumstances, it may be desirable to mount one of the units on each of the vehicles and to connect their free ends with the connector collar shown in Fig. 5. The connector collar consists of a pair of similar channel members 33 and 33' respectively that are substantially like the adapter plate channels 28 and 28' except that the collar 33 is wide enough to embrace two flanges simultaneously. A hinge 34 connects the two portions of the collar on one side while any suitable catch, such as the one designated 35, secures the collar around the flanges once it has been maneuvered into place. When two of my combination units are secured together in this manner as shown in Fig. 6, a pushing or towing connection of considerable additional flexibility is provided as compared to a similar connection made with a single unit.

The advantages of my combination pushing and towing device are numerous. In the first place, its adaptability to either pushing or towing is a considerable advantage. My device is also provided with an exceedingly simple means for attaching and detaching the units from a vehicle. The resilience of the coil spring absorbs shocks resulting from the inexpert maneuvering of the vehicles involved. Where the persons using my device are particularly inept, the device may be positively secured to both vehicles which reduces jerking and jarring, as when the vehicles become separated while the operator of the pushing vehicle is changing gears. Damage to vehicles and passengers is avoided therefore. When pushing one vehicle with another on a level surface, my combination pushing and pulling device is very simply used as shown in Fig. 4. On an uneven surface, only slightly additional effort is required to mount the pushing adapting fixture on the forward end of the unit as shown in Fig. 7. For long distance towing, two of the units may be secured together to give a particularly resilient connection for absorbing jars and jolts and to permit an uninhibited maneuvering of both vehicles. Also, of course, the resilient pad members 13 and 24 serve to protect highly polished chrome bumpers from disfiguring marks and abrasions, as well as to prevent slippage occurring between the plates and vehicles with which my units are used.

Some changes may be made in the construction and arrangement of my combination pushing and towing device and method of making same without departing from the real spirit and purpose of my invention, and it is my intention to cover by my claim, any modified forms of structure or use of mechanical equivalents which may be reasonably included within its scope.

I claim:

In a device of the class described, a pair of plates, a resilient and flexible member connecting said plates, means for limiting solely the extension of said resilient flexible member, resilient pads covering at least the sides of said plates opposite to the sides connected to said resilient and flexible member, and means for securing one of said plates to an end of a vehicle to extend in a horizontal attitude therefrom substantially parallel to the longitudinal axis of said vehicle.

References Cited in the file of this patent

UNITED STATES PATENTS

| Number | Name | Date |
| --- | --- | --- |
| 1,537,249 | Manley | May 12, 1925 |
| 1,632,922 | Sagar | June 21, 1927 |
| 1,977,817 | Bird | Oct. 23, 1934 |
| 2,101,622 | Milligan | Dec. 7, 1937 |
| 2,127,387 | Brattain | Aug. 16, 1938 |
| 2,247,664 | Osman | July 1, 1941 |